United States Patent [19]

Nilssen

[11] Patent Number: 4,638,395
[45] Date of Patent: Jan. 20, 1987

[54] PROTECTOR FOR SERIES-EXCITED PARALLEL-LOADED RESONANT CIRCUIT

[76] Inventor: Ole K. Nilssen, Caesar Dr., Barrington Hills, Ill. 60010

[21] Appl. No.: 686,447

[22] Filed: Dec. 26, 1984

[51] Int. Cl.[4] .............................................. H02H 3/12
[52] U.S. Cl. ....................................... 361/93; 361/91; 361/101; 315/DIG. 7
[58] Field of Search ........................ 361/15, 54, 57, 59, 361/87, 93, 100, 101, 91; 315/DIG. 5, DIG. 7; 307/131; 363/17, 50, 57

[56] References Cited
U.S. PATENT DOCUMENTS

| | | | |
|---|---|---|---|
| 4,167,689 | 9/1979 | Quirke | 315/DIG. 7 |
| 4,169,259 | 9/1979 | Hidler et al. | 315/DIG. 7 |
| 4,563,731 | 1/1986 | Sato et al. | 363/17 |

Primary Examiner—A. D. Pellinen
Assistant Examiner—Derek S. Jennings

[57] ABSTRACT

A resonant L-C circuit is series-excited from an AC voltage source and intended to be parallel-loaded with a load that, for some reason or another, may be inoperative. For efficiency reasons, the unloaded circuit Q-factor may be about 50 times higher than the loaded Q-factor; which implies that, if the load were to become inoperative, the power drawn by the L-C circuit from the source, and the voltage/current magnitudes developed in the L-C circuit, would be 50 times larger than when the load is operative. To prevent unnecessary power drain and/or to avoid damage to source and/or circuit components, which damage may occur even if the L-C circuit is left unloaded for but a very brief period, a circuit protector is provided.

This circuit protector comprises: (i) a Varistor to provide an absolute limit on the maximum attainable magnitudes of power, voltage and current, such as to protect protecting the source and the L-C circuit, and (ii) control arrangement operative to protect the Varistor from overloading as well as to prevent unnecessary power drain, which control arrangement provides for an intermittently interrupted short circuit across the tank-capacitor in case current flows through the Varistor for more than a very brief period of time. With the tank-capacitor shorted, the resulting power drawn from the source will be of negligible magnitude.

10 Claims, 1 Drawing Figure

PROTECTOR FOR SERIES-EXCITED PARALLEL-LOADED RESONANT CIRCUIT

BACKGROUND OF THE INVENTION

1. Field of Invention

The present invention relates to overload protection means for a series-excited parallel-loaded high-Q resonant L-C circuit.

2. Prior Art and General Background Considerations

Voltage-limiting non-linear resistance means, such as Varistors and Zener diodes, are commonly used to provide overload and/or overvoltage protection is situations where a high-Q resonant L-C circuit is series-excited from an AC voltage source and parallel-loaded with a load that, for one reason or another, may be or may become inoperative. However, with the load inoperative, the amount of power dissipated by the voltage-limiting means must by necessity be higher than the amount of power provided to the load when it is operative; and, when this power is relatively high—as may be the case in such applications as series-excited parallel-loaded power supplies for magnetrons and/or gas discharge lamps—the amount of power that has to be dissipated by the voltage-limiting means gets to be so large as to constitute a prohibitive proposition. Moreover, the energy waste associated with this dissipation may be considerable and should be avoided.

The following typical situation may help more specifically to illustrate the problem.

In powering a fluorescent lamp by way of a high-frequency series-resonant ballast, where the ballast constitutes a high-Q resonant L-C circuit series-excited from an AC voltage source and parallel-loaded by the fluorescent lamp, there is a serious problem associated with the situation where the fluorescent lamp for one reason or another ceases to constitute an effective load for this high-Q series-excited L-C circuit. In such a situation, which is most apt to occur toward the end of normal lamp life, the power drawn by the high-Q resonant L-C circuit from its AC voltage source is in most cases so excessively high as to cause damage to or even destruction of the L-C circuit and/or the AC voltage source. On the other hand, by connecting a voltage-limiting means, such as a Varistor, as an alternative parallel-load for the L-C circuit, damage to circuit and/or source may be prevented; however, the amount of power drawn from the source in case of an inoperative lamp will be so large as to represent an unacceptable level of energy waste—recognizing that it may often take a long time before a worn-out fluorescent lamp is replaced.

SUMMARY OF THE INVENTION

Objects of the Invention

An object of the present invention is that of providing cost-effective means for preventing overload and overvoltage problems in a situation of having a high-Q resonant L-C circuit series-excited by an AC voltage source and parallel-loaded by a load that at times may be inoperative.

This as well as other important objects and advantages of the present invention will become apparent from the following description.

BRIEF DESCRIPTION

An L-C circuit with an unloaded Q-factor of about 50 is series-connected directly across the output of a 60 Volt/30 kHz voltage source. This L-C circuit is resonant at 30 kHz, which means that it is series-resonant at the very frequency of the high-frequency voltage source.

A load, which might be a 40 Watt/120 Volt incandescent lamp, and a voltage-limiting means are both connected in parallel with the tank-capacitor of the L-C circuit, the voltage-limiting means being operative to limit the voltage developed across the tank-capacitor to a magnitude of about 180 Volt RMS.

Without the voltage-limiting means, with an unloaded Q-factor of 50 and linear circuit operation, the magnitude of the voltage developing across the tank-capacitor would have been 3000 Volt.

Under normal operation, with the particular circuit parameters chosen, the 40 Watt lamp limits the magnitude of the voltage developing across the tank-capacitor to about 120 Volt RMS; and at that point the loaded L-C circuit draws approximately 40 Watt of power from the source. Thus, with a loaded Q-factor of about 2.0 and an unloaded Q-factor of 50, the implication is that the losses in the L-C circuit amount to about 4.0% of the total power drawn from the source under normal operating conditions.

If for some reason the lamp should fail to constitute an effective load for the L-C circuit, the magnitude of the voltage across the tank-capacitor would increase to about 180 Volt, which implies that the power drawn from the source at that point would be about 60 Watt, with substantially all of it being dissipated in the voltage-limiting means.

If there were no voltage-limiting means present, however, the power drawn by the L-C circuit from the source—assuming no breakdown—would be about 1000 Watt, with all of it being dissipated within the L-C circuit itself.

The present invention provides for means to prevent the L-C circuit from operating in its resonant mode—and thereby to prevent it from drawing excessive power—in case the lamp should fail even for a brief period to constitute a proper load from the L-C circuit. This effect is accomplished by a transistor operative, by way of a rectifier bridge, to provide a short circuit across the tank-capacitor whenever lamp current fails to flow for about 10 milli-seconds.

With a short-circuited tank-capacitor, the amount of power drawn by the L-C circuit is negligibly small.

More particularly, a control means is connected with the the L-C circuit and is operative to provide for the following functions.

(a) Upon initially providing power to the L-C circuit, the control means provides for a short circuit across the tank-capacitor for an initial period of about 1.0 second.

(b) After this initial period, the control means removes the short circuit for a period of about 10 milli-seconds.

(c) If lamp current starts to flow within this 10 milli-second period, the control means operates to keep the short circuit removed for as long as lamp current flows.

(d) If lamp current fails to flow within this period, the control means re-imposes the short circuit and keeps it so imposed for another period of about 1.0 second; whereafter it again removes the short circuit for a period of about 10 milli-seconds; etc.

(e) It the lamp is removed from the L-C circuit, or if for some reason it fails to continue to operate, the control means operates to provide a short circuit across the tank-capacitor within a period of about 10 milli-seconds.

(f) As long as there is no lamp current flowing, the control means tries every 1.0 second (i.e., every 1000 milli-seconds) or so to provide power to the lamp for a period of about 10 milli-seconds. Thus, with a duty-cycle of about 10 milli-seconds out of 1000 milli-seconds (1.0%), the average power dissipation of the unloaded L-C circuit—as caused by dissipation in the voltage-limiting means—will be only about 0.6 Watt.

DESCRIPTION OF THE PREFERRED EMBODIMENT

Details of Construction

Figure 1:
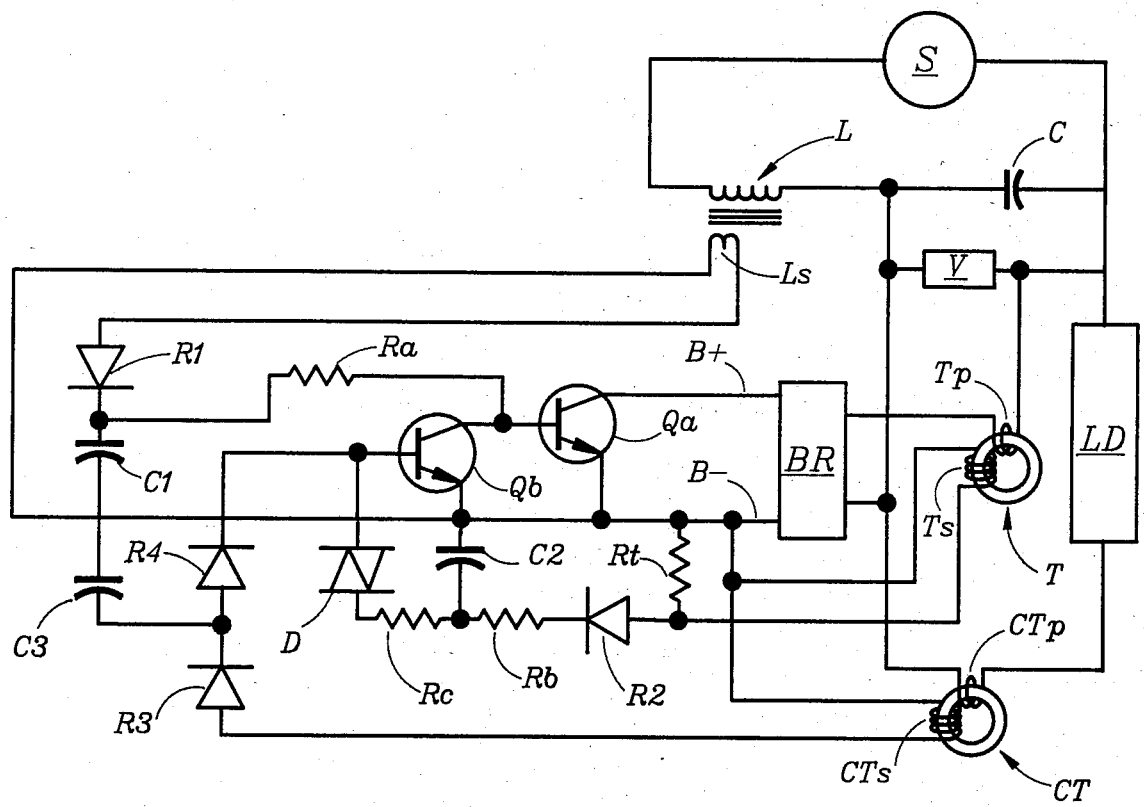
FIG. 1 provides a schematic circuit diagram of the preferred embodiment of the invention.

FIG. 1 shows an AC voltage source S, which in reality is a power-line-operated frequency converter providing an output voltage of 60 Volt RMS magnitude and 30 kHz frequency.

Connected directly across S is a series-combination of an inductor L and a capacitor C. Inductor L has a tightly coupled secondary winding Ls.

A Varistor V is connected directly across capacitor C.

A load LD, which is a 120 Volt/40 Watt incandescent lamp, is connected in series with the primary winding CTp of control transformer CT, and this series-combination of LD and CTp is connected across capacitor C.

A bridge rectifier BR, having a B+ output bus terminal and a B− output bus terminal, is connected in series with the primary winding Tp of transformer T, and this series-combination of BR and Tp is connected across capacitor C.

A transistor Qa is connected with its collector to the B+ bus and with its emitter to the B− bus.

A series-combination of a capacitor C1 and a rectifier R1, with R1 being connected with the capacitor by way of its cathode, is connected directly across the output of secondary winding Ls of inductor L. The cathode of rectifier R1 is connected to the base of transistor Qa by way of a resistor Ra.

A transistor Qb is connected with its collector and emitter to the base and emitter, respectively, of transistor Qa.

Transformer T has a secondary winding Ts connected between the B− bus and the anode of a rectifier R2. A resistor Rt is connected between this anode and the B− bus.

A series-combination of a resistor Rb and a capacitor C2 is connected between the anode of rectifier R2 and the B− bus, with one terminal of resistor Rb being connected with the cathode of R2.

A series-combination of a resistor Rc and a Diac D is connected between the base of transistor Qb and the junction between resistor Rb and capacitor C2.

Control transformer CT has a secondary winding CTs connected between the B− bus and the anode of a rectifier R3. A rectifier R4 is connected between the cathode of rectifier R3 and the base of transistor Qb, the anode of rectifier R4 being connected with the cathode of rectifier R3.

A capacitor C3 is connected between the cathode of rectifier R3 and the B− bus.

Details of Operation

In FIG. 1, when the 60 Volt/30 kHz voltage from source S is initially applied to the L-C series-circuit, a voltage is developed across secondary winding Ls. This voltage is rectified and filtered by rectifier R1 and capacitor C1, and then applied to the base of transistor Qa by way of a current-limiting resistor Ra. The value of Ra is so chosen that the resulting DC current provided to the base of transistor Qa is adequate to make this transistor conduct in a substantially saturated mode and thereby to constitute an effective short circuit between the B+ bus and the B− bus. With transistor Qa so conducting, and since transformer T is a current transformer with a very low-impedance primary winding, and since a short circuit at the output of the bridge rectifier is essentially equivalent to a short circuit at its input, there is in effect a short circuit provided across tank-capacitor C. Thus, as long as transistor Qa is an effective short circuit, the magnitude of the current drawn from the source is limited by the reactance of L, which means that only a relatively modest amount of reactive power will then be drawn from the source.

As long as transistor Qa conducts, current is forced through the primary winding Tp of transformer T. By transformer action, this current is provided to the resistor Rt loading the secondary winding Ts of transformer T. By way of rectifier R2, the voltage resulting across Rt is used for charging capacitor C2 with a current that is limited by resistor Rb. Eventually, the magnitude of the voltage on C2 gets to be high enough to cause Diac D to break down, at which point the charge accumulated on capacitor C2 gets discharged into the base of transistor Qb—with the magnitude of the discharge current being principally determined by the resistance of Rc. This magnitude is so chosen that—as soon as the Diac breaks down—transistor Qb becomes conductive to the point of shunting away the base current provided to transistor Qa by way of resistor Ra.

In other words, as soon as the voltage on capacitor C2 has increased to some pre-determined magnitude, the Diac breaks down and immediately renders transistor Qa non-conductive. The time it takes for the voltage on capacitor C2 to reach this predetermined magnitude is a function of the time-constant associated with C2 and Rb as well as of the magnitude of the voltage being provided by the tertiary winding Tt. In the circuit of FIG. 1, this time was chosen to be about 1.0 second.

For as long as capacitor C2 is providing base current for transistor Qb, this transistor is operative to prevent current from being applied to the base of transistor Qa, thereby making Qa non-conductive. The length of time during which Qa is thereby kept non-conductive is determined principally by the parameters of capacitor C2 and resistor Rc. In the circuit of FIG. 1, these parameters were so chosen as to make this length of time about 10 milli-seconds.

Thus, after the initial period of about 1.0 second, during which Qa represents a short circuit, Qa is switched off and becomes an open circuit for about 10 milli-seconds. During this 10 milli-second period, the voltage across capacitor C increases in magnitude to the point where the lamp operates at the proper point of 120 Volt/40 Watt.

As soon as the lamp current starts to flow, control transformer CT, by way of rectifier R3 and filter capacitor C3, provides a DC current to the base of transistor Qb, thereby causing transistor Qb to continue to shunt away the base current for transistor Qa. Thus, as long as the lamp starts to draw current within the 10 milli-second period, transistor Qa will continue to stay non-conductive, and the lamp will continue to operate.

However, if lamp current does not start to flow within the 10 milli-second period, base current for transistor Qb will cease, which means that Qb will cease shunting away the base current for Qa. Thus, after about 10 milli-seconds, if lamp current fails to flow, transistor Qa will again become conductive and operative to provide a short circuit across capacitor C.

Now, with Qa conductive, current will again flow through the primary winding Tp of transformer P, and again will cause C2 to charge to the point of breaking down the Diac; which then again starts a 10 milli-second period of shunting away the base current for transistor Qa.

In other words, with the lamp inoperative or disconnected, the circuit of FIG. 1 operates in a cyclical fashion, with each cycle consisting of a 1.0 second period during which transistor Qa is conductive—which implies that capacitor C is shorted—and a 10 milli-second period during which transistor Qa is non-conductive. With the lamp operating, on the other hand, this cyclical circuit operation is prevented by the flow of lamp current.

Of course, by different choices for the circuit parameters, the 1.0 second ON-time and/or the 10 milli-second OFF-time may be adjusted to suit a wide variety of applications.

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement operable to power a load from a source of AC voltage, comprising:
    an L-C circuit series-connected across said source, said L-C circuit being series-resonant at or near the frequency of said AC voltage and having at least one inductive and one capacitive reactance means;
    connect means operable to connect said load in parallel-circuit with one of said reactance means; and
    control means connected in circuit with the load, said control means being operative, but only when there is no current flowing through the load, to cause a repetitive alternation between two states: a first state characterized by the provision of an effective short circuit across said one of said reactance means, and a second state characterized by not providing such a short circuit.

2. The arrangement of claim 1 wherein said first state is further characterized by being substantially longer in duration than said second state.

3. The arrangement of claim 2 wherein the duration of said second state is substantially longer than the duration of one full period of said AC voltage.

4. The arrangement of claim 1 wherein said control means comprises rectifier means and transistor means operative to provide for said effective short circuit.

5. The arrangement of claim 1 wherein a voltage-limiting non-linear resistance means is effectively connected in parallel-circuit with said one of said reactance means.

6. An arrangement adapted to power a load from a source of AC voltage, comprising:
    an L-C circuit series-connected across said source, said L-C circuit being series-resonant at or near the frequency of said AC voltage and having at least one inductive and one capacitive reactance means;
    connect means operable to permit connection of said load in parallel-circuit with one of said reactance means; and
    shorting means operative to effectively provide an intermittently interrupted short circuit across said one of said reactance means.

7. The arrangement of claim 6 wherein said shorting means is prevented from providing said intermittently interrupted short circuit across said one of said reactance means, but only as long as the load is connected with said connect means and as long as current is flowing through the load.

8. The arrangement of claim 6 having voltage-clamping means connected in parallel-circuit with said one of said reactance means.

9. The arrangement of claim 6 wherein the frequency of said AC voltage is substantially higher than the frequency of the voltage normally present on an ordinary electric utility power line.

10. A power supply arrangement comprising:
    a source of periodic high-frequency AC voltage;
    an L-C circuit series-connected across said source, said L-C circuit being resonant at or near the frequency of said AC voltage and having at least one inductive and one capacitive reactance means;
    a load connected in parallel with one of said reactance means; and
    shorting means operative, except when current is flowing through the load, to effectively provide an intermittently interrupted short circuit across said one of said reactance means.

* * * * *